(12) United States Patent
Pedersen et al.

(10) Patent No.: US 9,234,596 B2
(45) Date of Patent: Jan. 12, 2016

(54) VALVE FOR CONTROLLING THE LIQUID FLOW IN A PLANT FOR CENTRAL HEATING

(75) Inventors: Gitte Pedersen, Odense NV (DK); Mille Sveje Bøjgaard, Copenhagen Ø (DK); Carsten Møller, Slagelse (DK); Bjarne Wittendorff Ibsen, Dubai (UA)

(73) Assignee: FlowCon International ApS, Slagelse (DK)

(*) Notice: Subject to any disclaimer, the term of this patent is extended or adjusted under 35 U.S.C. 154(b) by 0 days.

(21) Appl. No.: 14/131,303

(22) PCT Filed: Jul. 6, 2012

(86) PCT No.: PCT/EP2012/063252
§ 371 (c)(1),
(2), (4) Date: Mar. 19, 2014

(87) PCT Pub. No.: WO2013/007633
PCT Pub. Date: Jan. 17, 2013

(65) Prior Publication Data
US 2014/0191148 A1    Jul. 10, 2014

(30) Foreign Application Priority Data
Jul. 8, 2011 (DK) ................................. 2011 70371

(51) Int. Cl.
*F16K 5/04* (2006.01)
*F16K 5/10* (2006.01)
(Continued)

(52) U.S. Cl.
CPC .................. *F16K 5/0407* (2013.01); *F16K 3/24* (2013.01); *F16K 3/32* (2013.01); *F16K 5/10* (2013.01)

(58) Field of Classification Search
CPC ............... F16K 3/24; F16K 3/32; F16K 5/04; F16K 5/0407; F16K 5/10; F16K 5/12

USPC .............. 251/207–209; 137/500–501, 625.17
See application file for complete search history.

(56) References Cited

U.S. PATENT DOCUMENTS 2,943,792 A * 7/1960 Moen ........................ 137/625.17
2,951,501 A * 9/1960 Thylefors ...................... 251/207
(Continued)

FOREIGN PATENT DOCUMENTS

| DK | 2001 00281 | 8/2002 |
| DK | 176350 B1 | 9/2007 |

(Continued)

OTHER PUBLICATIONS

PCT International Preliminary Report on Patentability for International Application No. PCT/EP2012/063252, date of completion Sep. 10, 2013.

(Continued)

*Primary Examiner* — John Bastianelli
(74) *Attorney, Agent, or Firm* — Brinks Gilson & Lione

(57) ABSTRACT

A valve with a valve housing for controlling the liquid flow in a plant for central heating is provided. The valve includes an insert part with valve parts for controlling a liquid flow through the valve: a first part and a second part being mutually rotatable. The first and the second parts are provided with complementary through-flow openings that combine to define a common opening area and are configured such that, upon mutual rotation of those valve parts, a larger or a smaller total opening area is provided. The valve includes a closure part which is disposed such that, upon axial displacement, the closure part is capable of completely or partially closing off the total opening area through the through-flow openings.

7 Claims, 4 Drawing Sheets

(51) Int. Cl.
*F16K 3/24* (2006.01)
*F16K 3/32* (2006.01)

(56) References Cited

U.S. PATENT DOCUMENTS

| | | | |
|---|---|---|---|
| 3,100,620 A * | 8/1963 | Kates | 251/208 |
| 3,538,952 A * | 11/1970 | Bayer | 251/208 |
| 4,702,279 A * | 10/1987 | Giese | 137/625.17 |
| 5,178,324 A * | 1/1993 | Moesby | 237/8 R |
| 5,860,591 A * | 1/1999 | Gylov et al. | 236/42 |
| 6,167,904 B1 * | 1/2001 | Nielsen et al. | 137/468 |
| 2008/0245428 A1* | 10/2008 | Jorgensen | 137/627.5 |
| 2009/0321672 A1* | 12/2009 | Ibsen et al. | 251/207 |
| 2011/0068284 A1* | 3/2011 | Jorgensen | 251/46 |

FOREIGN PATENT DOCUMENTS

| | | |
|---|---|---|
| EP | 0 119 503 A1 | 9/1984 |
| EP | 2 466 174 A1 | 6/2012 |
| PL | 186205 B1 | 6/1998 |
| PL | 183490 B1 | 1/1999 |
| WO | WO 2006/136158 A1 | 12/2006 |
| WO | WO 2008-052553 A1 | 5/2008 |
| WO | WO 2009/006893 A1 | 1/2009 |
| WO | WO 2009/132658 A1 | 11/2009 |
| WO | WO 2009/135490 A2 | 11/2009 |

OTHER PUBLICATIONS

PCT Int'l Search Report for International Application No. PCT/EP2012/063252, mailing date Sep. 14, 2012.

Polish Patent Office Prior Art Report dated Jun. 3, 2014 for Polish Application No. P.404536.

* cited by examiner

VALVE FOR CONTROLLING THE LIQUID FLOW IN A PLANT FOR CENTRAL HEATING

This application claims the benefit under 35 U.S.C. §371 of International Application No. PCT/EP2012/063252, filed Jul. 6, 2012, which claims the benefit of Danish Patent Application No. PA201170371, filed Jul. 8, 2011, which are incorporated by reference herein in their entirety.

FIELD OF THE INVENTION

The invention relates to a valve with a valve housing, in particular for controlling the liquid flow in a plant for central heating, said valve comprising an insert part with a first part and a second part for controlling a liquid flow through the valve, said first part and said second part being mutually rotatable and provided with complementary through-flow openings that combine to define a common opening area, said through-flow openings being configured such that, upon mutual rotation between the first and the second part, a larger or a smaller total opening area is provided.

BACKGROUND

From Danish patent application No. 2001 00281 a roller membrane valve is known for maintaining constant liquid flow in a heating or cooling system. That valve comprises an electric regulator unit which is adapted to the valve.

By that known valve it is not possible to set a maximal flow within which the valve subsequently modulates or regulates.

From Danish patent disclosure DK 176350 B2 a valve is known wherein a maximal flow can be set by means of two concentrically journalled valve bodies.

It is a drawback of that system: that each of the valve bodies is expensive and complex, and that it is consequently not easy or inexpensive to replace those concentrically journalled valve parts.

BRIEF SUMMARY

It is an object of the invention to provide a system by which those drawbacks are minimised.

This is accomplished by it further comprising a closure part which is disposed such that, upon axial displacement, it is capable of completely or partially closing off the total opening area through the through-flow openings. At the same time it is accomplished that the ongoing regulation of the valve takes place by means of a body (the closure part) which does not influence the setting of the maximal flow.

Embodiments are set forth in the dependent claims.

BRIEF DESCRIPTION OF THE DRAWINGS

In the following, an embodiment of the invention will be explained with reference to the figures, wherein.

DETAILED DESCRIPTION

Figure 1:
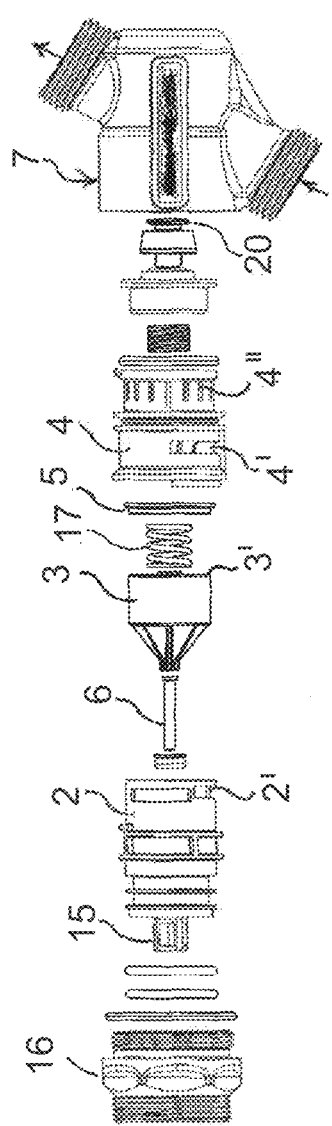
FIG. 1 shows an exploded view of an embodiment of a valve system according to the invention.

FIG. 1 shows an embodiment of a valve according to the invention. Thus, to the right of the figure, a valve housing 7 is shown that has an outlet (indicated by an arrow pointing out of the valve housing) and an inlet (indicated by an arrow pointing into the valve housing).

The valve as such may be a differential-pressure-independent valve that comprises two subunits, viz. a so-called regulator part and a differential pressure part.

The units of the differential pressure part as such are not of any consequence to the functionality of the regulator part, and consequently they will not be subject to more detailed explanation.

The valve comprises internal parts for regulating the maximal flow through the valve. Those parts are a first valve part 4, a second valve part 2, and a closure part 3. The valve part 4 which is, in the shown embodiment, fixated within the valve housing, is configured with a recess 4'. In the shown example, the recess extends about 180 degrees, but, of course, that may be varied within the ordinary work of the person skilled in the art, typically within the angular interval of about 90 degrees to about 270 degrees, preferably from about 105 degrees to about 255 degrees, from about 120 degrees to about 240 degrees, from about 135 degrees to about 225 degrees, from about 150 degrees to about 210 degrees, from about 165 degrees to about 195 degrees, from about 170 degrees to about 190 degrees, or from about 175 degrees to about 185 degrees.

In the shown example, the part 4 is, as mentioned, fixated within the valve housing, but, of course, that need not always be the case. To the right of the valve part 4, a number of other recesses 4" are shown. They serve as exit conduits from the valve part when it is inserted into the valve housing to the effect that a liquid running into the valve housing via the inlet first travels into the valve part interior via the recess 4' and subsequently leaves the valve part interior via the recesses 4" to subsequently leave the valve housing via the outlet.

To the left of the valve part 4, a gasket 5 is provided. That gasket can be introduced into the valve part 4 and its purpose is to accomplish a tight connection between the first 4 and the second 2 part of the valve when the second part 2 is introduced into the first part. This is accomplished in that the bottom of the second valve part 2 (seen to the right in the figure) has to abut on the gasket in use.

When the second part (also designated the pre-setting part) has been introduced into the first part (also designated the stationary part), the openings 2' in the pre-setting part will be flush with the openings 4' in the stationary part and a mutual rotation between those parts will therefore expose a larger or a smaller area which is, in the following, designated the common opening area.

Between the stationary part and the pre-setting part, a cylindrical closure part 3 is shown having a lower edge 3' which is intended for being introduced into the pre-setting part 2. In use of the shown valve, the closure part will be situated within the pre-setting part 2 that will, in turn, be situated within the stationary part 4, but that configuration is not final either since the mutual location of those three parts can, of course, be varied within the ordinary work of the person skilled in the art. Preferably the closure part 3 is configured in plastics.

In the shown embodiment, the pre-setting part and the stationary part cannot be shifted axially in use, but rather they can be rotated relative to each other in such a way that the recesses in the two parts slide across each other. Thereby a larger or smaller common opening area is revealed/exposed.

In contrast, the closure part 3 can be displaced axially within the pre-setting part 2, and thereby the closure part will gradually close off the common opening area to an increasing extent, as it is introduced, and finally it will block through-flow completely.

This principle is used in the valve to obtain a valve wherein, via a rotary knob 15, one may turn the pre-setting part to a desired maximal flow, while the axial position of the closure part 3 as such can be regulated; thereby thus also enabling regulation of the through-flow through the valve within the set maximal flow via conventional equipment such as e.g. an actuator working via the peg 6.

The valve shown in FIG. 1 is configured such that, when the valve is assembled, the peg 6 will exit through the upper face of the pre-setting knob 15 (to the left in the figure) which will again exit through the cover 16 on which an actuator can be mounted at a later stage.

Figure 4:
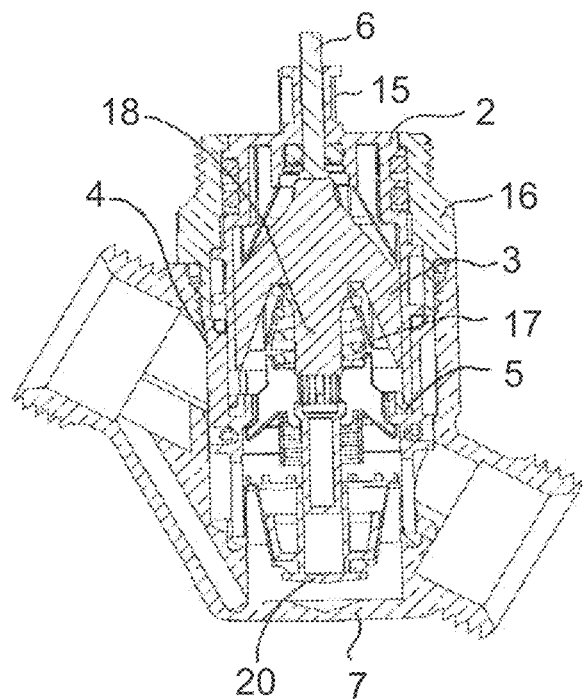
FIG. 4 is a sectional view of an embodiment of an assembled valve according to the invention.

The assembly as such of the valve appears best from FIG. 4 where, in a sectional view, the valve is seen in assembled state; here it will appear that the peg 6 exits through the pre-setting knob 15 which is directly connected to (sits on) the pre-setting part 2 which is, with its lower part, inserted into the stationary part 4, and at the bottom (the part facing downwards in the drawing) abuts on the gasket 5. The closure part 3 as such is inserted into the pre-setting part 2, and is at a lower end 18 (which cannot be shown in FIG. 1 due to it being disposed within the closure part 3) controlled supported by a spring 17. As a remark it can be mentioned that at the bottom of the valve, a membrane guide 20 will appear; which forms a part of the said differential pressure unit mentioned above but not outlined in detail.

Figure 2:
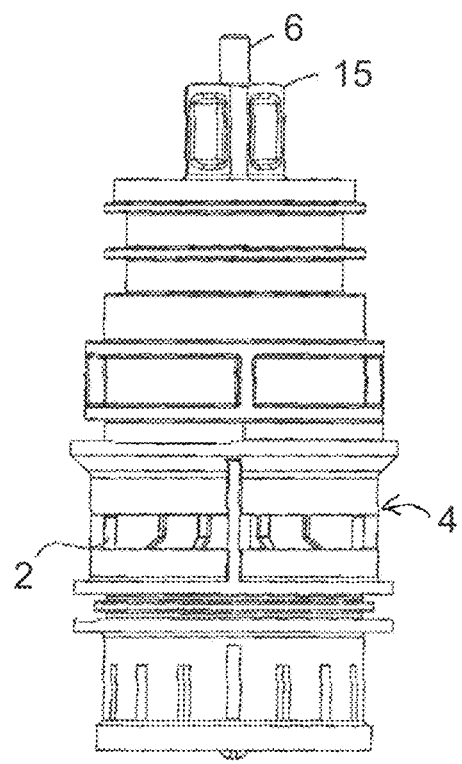
FIG. 2 shows an insert part, wherein the two valve bodies are positioned to a maximal flow.
Figure 3:
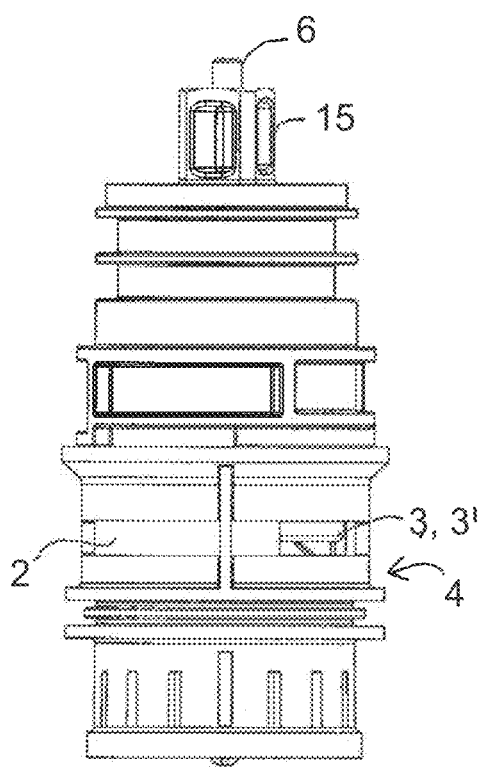
FIG. 3 shows an insert part, wherein the two valve bodies are positioned to a reduced maximal flow.

FIGS. 2 and 3 illustrate the functionality of the invention more clearly. Thus, one will see that the pre-setting knob 15 has been turned somewhat from FIG. 2 to FIG. 3. Thereby the pre-setting part 2 has also been turned relative to the stationary part 4, and it will thus appear from FIG. 3 that the common opening area is smaller than it is in FIG. 2, as a part of the pre-setting part 2 partially blocks it.

Moreover, one will also see that, between FIGS. 2 and 3, there is a small difference as to how far the peg 6 has been pressed into the pre-setting knob 15, and, as shown in FIG. 3, one may also see that a part of the closure part 3 with the lower edge 3' has thereby reduced the common opening area.

Albeit it will appear from the above that closure part, pre-setting part, and the stationary part are all constituted by cylindrical bodies that can be turned relative to each other, this is not a prerequisite. For instance, the pre-setting part and the closure part may very well be formed such that they cannot be turned relative to each other, but rather only allow an axial mutual displacement. The most important is that, upon axial displacement, the closure part will be able to cover the common opening area.

Albeit, in the example explained above, the stationary part is stationary relative to the valve housing, it is, as also mentioned above, also an option that it may be movable relative to the valve housing. The most important is that this part is rotatable relative to the pre-setting part or, in other words, that those two parts are mutually turnable to thereby alter the common opening area.

In the following the term "comprising" in the claims does not exclude other elements or steps, while the terms "a" or "an" as used in the claims do not exclude a plurality.

The invention claimed is:

1. A valve with a valve housing for controlling the liquid flow in a plant for central heating, said valve comprising:
    an insert part with a first part and a second part for controlling a liquid flow through the valve, said first part and said second part being mutually rotatable and provided with complementary through-flow openings that combine to define a common opening area, said through-flow openings being configured such that, upon mutual rotation between the first and the second part, a larger or a smaller total opening area is provided, and a separate closure part which is disposed such that, upon axial displacement, said separate closure part is capable of completely or partially closing off the total opening area through the through-flow openings,
    wherein the closure part has a cylindrical portion for insertion into the second part and
    wherein the closure part is rotatably journalled within the second part.

2. The valve according to claim 1 further comprising a membrane guide.

3. The valve according to claim 1, wherein the first part is stationary relative to the valve housing.

4. The valve according to claim 1, wherein the second part is stationary relative to the valve housing.

5. The valve according to claim 1, wherein the second part is rotatably journalled within the first part.

6. The valve according to claim 1, wherein the closure part and the second part are configured such that relative to each other, the closure part can be shifted only axially relative to the second part.

7. The valve according to claim 1, wherein the closure part comprises a plastic material.

* * * * *